United States Patent [19]

St. John

[11] 4,062,433
[45] Dec. 13, 1977

[54] QUICK RELEASE CENTRIFUGAL CLUTCH CONSTRUCTION

[75] Inventor: Richard C. St. John, North Canton, Ohio

[73] Assignee: Aspro, Inc., Canton, Ohio

[21] Appl. No.: 713,140

[22] Filed: Aug. 10, 1976

[51] Int. Cl.² ............................................. F16D 43/14
[52] U.S. Cl. ................................. 192/104 R; 73/538
[58] Field of Search .......... 192/104 R, 103 A, 105 C, 192/105 CS; 73/538, 547

[56] References Cited

U.S. PATENT DOCUMENTS

| 1,062,780 | 5/1913 | Kennedy | 192/104 R |
| 1,316,466 | 9/1919 | Taeubert | 192/104 R |
| 1,585,567 | 5/1926 | Sommer | 192/104 R |
| 2,432,591 | 12/1947 | Shuckers | 192/104 R |

FOREIGN PATENT DOCUMENTS

| 2,224,979 | 12/1973 | Germany | 192/104 R |

*Primary Examiner*—Benjamin W. Wyche
*Attorney, Agent, or Firm*—Frease & Bishop

[57] ABSTRACT

A quick release centrifugal clutch construction having a driven member rotatably mounted on a shaft and a drive member rotatable with the shaft and axially engageable with the driven member. The drive member includes a rotor mounted on the shaft for rotation with the shaft. A cartridge is axially slidably mounted on the shaft and has a frictional coupling surface for engagement with the driven member, and has a preloaded disc spring mounted thereon. A drive block also is axially slidably mounted on the rotor and is adapted to engage the cartridge to further load the disc spring and to drivingly connect the cartridge with the driven member. A plurality of individual pairs of links are mounted circumferentially spaced on the rotor and are movable in radial directions between retracted and extended positions. The inner ends of each of the link pairs are pivotally joined by a pivot pin with the outer link ends being pivotally connected to the drive block and rotor member respectively. Coiled tension springs maintain the link pairs in retracted position, whereby the pivotal connections of the inner link ends are located radially inwardly of imaginary lines extending in a generally axial direction between the pivot connections of the outer ends of the links. The link inner ends move radially outwardly under the influence of centrifugal force and overcome the tension of the coiled spring when the shaft reaches a predetermined speed. The drive block slides axially away from the cartridge releasing the coupling pressure exerted thereon, upon the pivotally connected center point of the links moving radially outwardly past the imaginary line of the link pair to instantaneously disengage the coupled members.

15 Claims, 8 Drawing Figures

QUICK RELEASE CENTRIFUGAL CLUTCH CONSTRUCTION

BACKGROUND OF THE INVENTION

1. Field of the Invention

The invention relates to clutches and particularly to clutches which operate automatically by centrifugal force at a predetermined speed of rotation to disconnect a driving member from a driven member or load. More particularly, the invention relates to a centrifugal clutch construction in which the driving and driven members are uncoupled generally and instantaneously upon the members reaching a predetermined rotational speed without a reduction in coupling tension prior to the disengagement speed being reached, and with minimum clutch slippage.

2. Description of the Prior Art

There are numerous types and arrangements of centrifugal clutch constructions in which the drive and driven members are retained in coupled engagement until sufficient centrifugal force acts on certain clutch components to overcome the force of a retaining spring, whereupon the drive member disengages automatically from coupled engagement with the driven member. Many such clutch constructions experience excessive wear of the frictional coupling surfaces since the coupling disengagement is somewhat gradual as the coupled members come up to disengagement speed to overcome the srping tension. This results in undesirable slippage and heating between the coupling surfaces of the drive and driven members.

Some of these high speed release clutch constructions use spring biased levers and balls to retain the coupling surfaces in engaged position and to actuate the disengagement thereof upon reaching a predetermined rotational speed. Examples of such clutch constructions are shown in U.S. Pat. Nos. 2,432,591, 2,879,871, 2,879,872, 3,059,744, 3,319,755 and 3,747,731.

Various other clutch constructions use pairs of pivotally mounted toggle-like links to achieve disengagement at a predetermined speed. The links are adapted to move radially outwardly under the influence of centrifugal force and overcome a retaining spring or springs whereupon the applied pressure of the spring is removed from the coupled members to effect disengagement. Such action occurs upon the pivotally connected inner link ends moving sufficiently radially beyond a center line extending between the outer pivotally fixed ends of the links, such as shown in U.S. Pat. No. 1,316,466. A somewhat similar clutch construction uses pairs of links eccentrically attached to centrifugal balls as shown in U.S. Pat. No. 1,585,567.

These constructions use a pair of springs, one of which biases the midpoint of the link pairs toward their retracted coupling position, with the other spring biasing the drive coupling member into engagement with the driven coupling member. Such constructions, however, do not provide a rapid disengagement upon the coupled members reaching a predetermined speed which in certain clutch applications is desirable to reduce slippage and wear of the coupling surfaces. These prior art clutches have a linear clutch torque-speed characteristic since the retaining springs have a linear spring rate (force-displacement) characteristic; that is the disengagement force acting on the coupling spring and correspondingly on the coupling force between the driven and drive members is proportional to the centrifugal force acting on the links and centrifugal weights. These relationships provide a gradual disengagement between the coupled members as the clutch approaches disengagement speed causing such undesirable slippage and heating.

This linear relationship also increases the distances through which the retaining springs must move before clutch disengagement occurs. Therefore, the clutch may be larger than desired to accommodate this spring movement.

There is no known quick relase centrifugal clutch construction of which I am aware which provides an instantaneous disengageable clutch construction using a preloaded spring cartridge; providing a stepped distance-force relationship, requiring a relatively small motion to achieve a relatively large force amplification.

SUMMARY OF THE INVENTION

Objectives of the invention include providing a quick release centrifugal clutch construction in which the drive and driven members are held in coupled engagement until a predetermined rotational speed is achieved by link assemblies operatively engageable with a preloaded spring disc mounted on an axially movable cartridge; providing such a clutch construction in which the link assemblies each includes a pair of links, the outer ends of which are pivotally mounted and immovable in a radial direction with the inner link ends being pivotally connected by a pin which is movable radially between retracted and extended positions, and in which this pivotal connection pin lies radially inwardly of an imaginary axially extending line connecting the centers of the pivot pins of the outer link ends; providing such a clutch construction in which one of the link outer ends is connected to an axially slidable drive block which operatively engages the preloaded disc spring when the link assemblies are in retracted position, whereby the preload of the disc spring cooperates with a coil spring connected to the radially movable link pivot pin to retain the links in retracted position; providing such a clutch construction in which the preloaded disc spring biases the link assemblies toward extended position immediately upon the movable central connecting pivot pin moving radially outwardly beyond the imaginary center line of the fixed pivot pins to generally instantaneously operatively disengage the drive block from the cartridge to uncouple the clutch components; providing such a clutch construction in which a very small movement of the drive block and cartridge components applies a large force on the coupled members or on the link assemblies to achieve coupling or uncoupling action respectively, upon the pivot connection moving below or above the imaginary center line of the link assemblies; providing such a clutch construction in which various clutch operating characteristics can be achieved by varying the amount of preload on the disc spring depending upon the particular spring rate of the disc spring selected; providing such a clutch construction having manual adjustment means to enable the amount of additional force applied to the preloaded disc spring to be varied when the link assemblies and clutch components are in coupled position; and providing a quick release centrifugal clutch construction which is of a relatively simple arrangement, easy to manufacture and assemble, sturdy and durable in use, which achieves a space savings by limiting the amount of spring movement required for clutch operation, and which eliminates difficulties heretofore encountered with other known clutch constructions, achieves the objectives indicated and solves problems and satisfies needs existing in the art.

The objectives and advantages are obtained by the quick release centrifugal clutch construction, the general nature of which may be stated as including power driven rotary shaft means; a driven clutch member rotatably mounted on the shaft means; cartridge means mounted on the shaft means and slidably movable axially along the shaft means for coupling engagement with the driven clutch member for drivingly rotating the driven clutch member; disc spring means mounted on the cartridge means and preloaded to a predetermined displaced biased condition; block means mounted on the shaft means and slidable axially along the shaft means for operative engagement with the preloaded disc spring means to further compress said disc spring means and to force the cartridge means into coupling engagement with the driven clutch member; a pair of link means pivotally connected at their inner ends, with the outer end of one of said link means being pivotally connected with respect to the shaft means, and the outer end of the other of the link means being pivotally connected to the block means, the inner ends of the link means being pivotally movable radially inwardly and outwardly between retracted and extended positions, respectively, with the inner end pivotal connection being located radially inwardly of an imaginary line extending between the pivotal connections of the outer ends of the link means when in retracted position; and coil spring means biasing the link means inner ends radially inwardly toward retracted position and biasing the block means into engagement with the cartridge means to drivingly connect the cartridge means and driven clutch member until the drive shaft means reaches a predetermined rotational speed, whereupon said link means inner ends move radially outwardly under the influence of centrifugal force from retracted toward extended position and disengage gnerally instantaneously the block means from operative engagement with the cartridge means to disconnect the cartridge means from driving engagement with the driven member.

BRIEF DESCRIPTION OF THE DRAWINGS

A preferred embodiment of the invention — illustrative of the best mode in which applicant has contemplated applying the principle — is set forth in the following description and shown in the accompanying drawing, and is particularly and distinctly pointed out and set forth in the appended claims.

Similar numerals refer to similar parts throughout the various figures of the drawings.

DESCRIPTION OF THE PREFERRED EMBODIMENT

Figure 1:
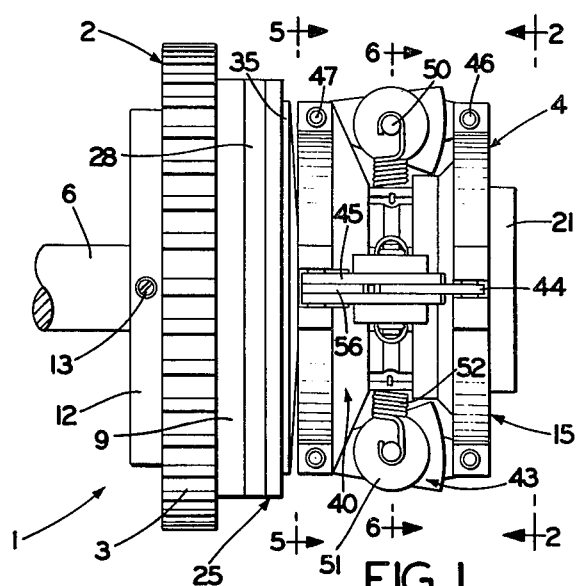
FIG. 1 is a plan view of the improved quick release centrifugal construction in engaged position with a driven member gear.
Figure 5:
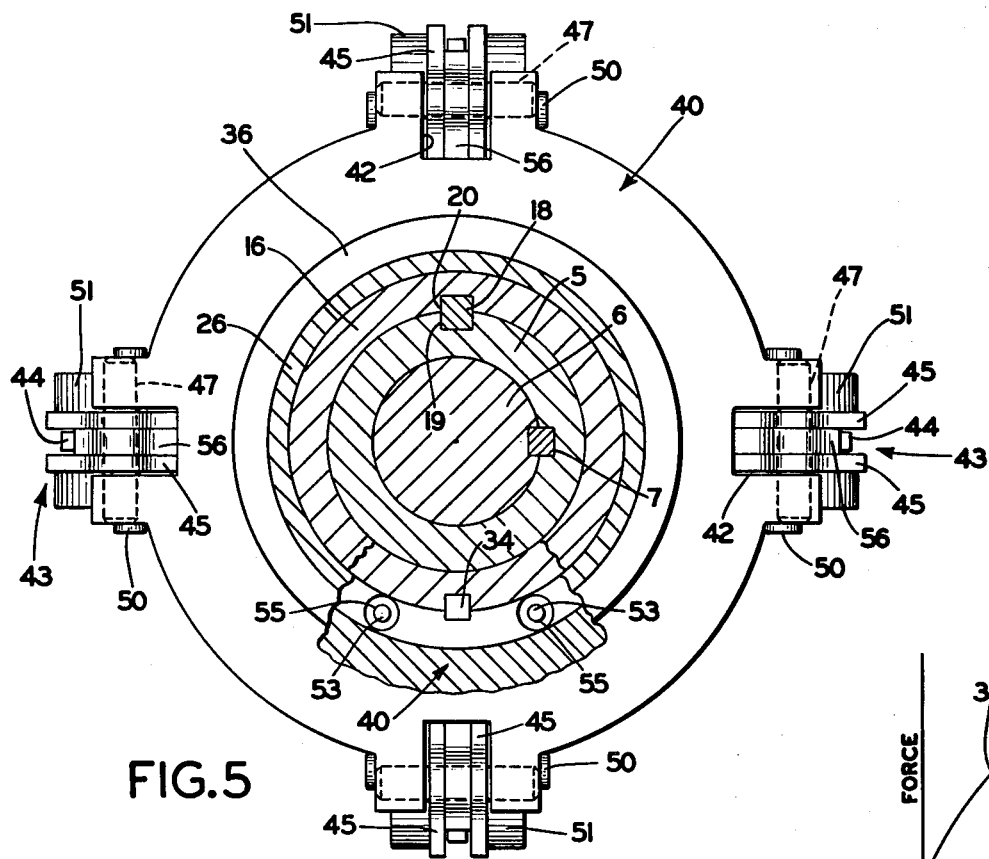
FIG. 5 is an enlarged sectional view taken on line 5—5, FIG. 1.
Figure 6:
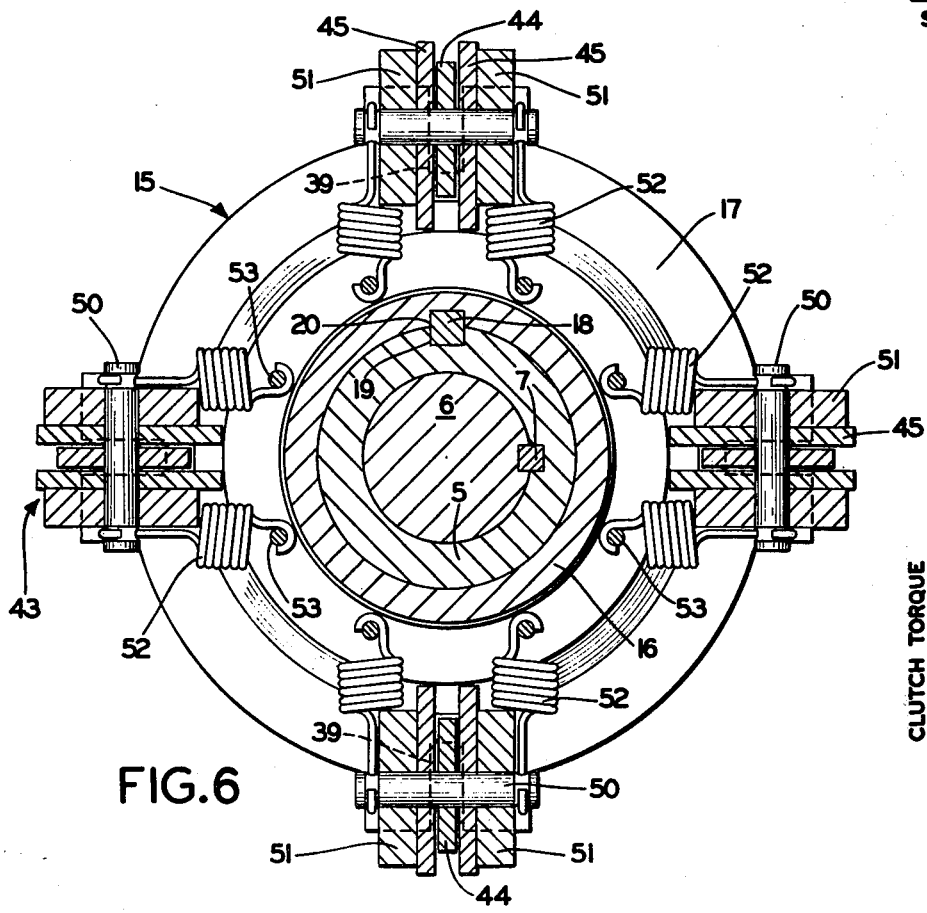
FIG. 6 is an enlarged sectional view taken on line 6—6, FIG. 1.

The improved quick release clutch construction is indicated generally at 1, and is shown particularly in FIG. 1. Clutch 1 includes a driven member 2 having a ring gear 3 mounted thereon, and a drive member 4. Drive member 4 has a generally cylindrical sleeve 5 which is attached to a power drive shaft 6 by a key 7 (FIGS. 5 and 6) for rotation with shaft 6.

The driven member 2 is rotatably mounted on sleeve 5 by a ball bearing assembly 8 which is mounted between sleeve 5 and gear body 9 and is retained thereon by a retaining ring 10. Ring gear 3 is secured on body 9 by a collar 12 and setscrew 13. Gear body 9 is provided with an annulr radially extending surface 14 concentric with shaft 6 which provides one of the surfaces for coupling engagement between driven member 2 and drive member 4.

Figure 2:
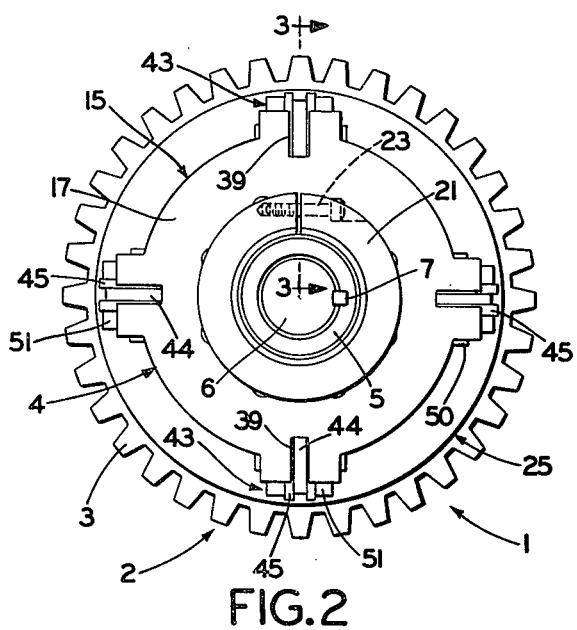
FIG. 2 is an end elevation of the improved clutch construction shown in FIG. 1, looking in the direction of arrows 2—2, FIG. 1.
Figure 3:
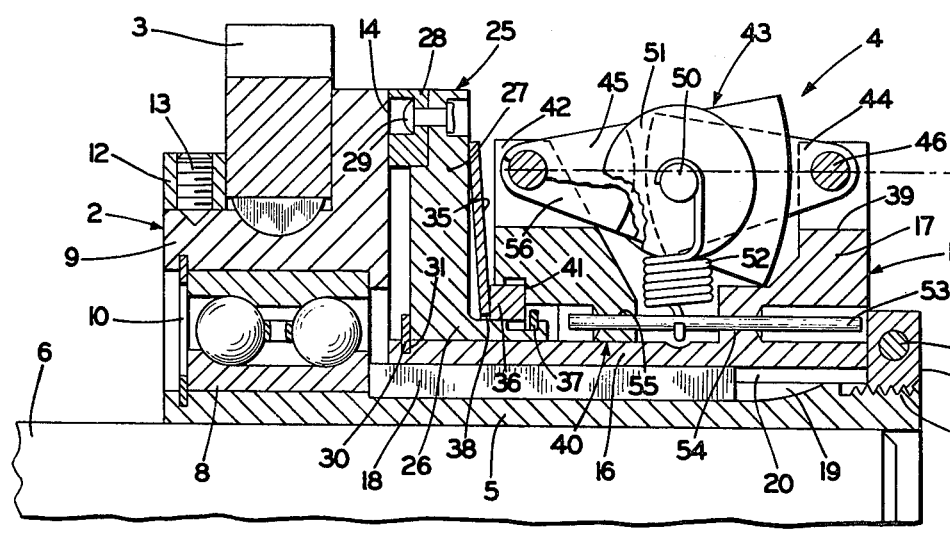
FIG. 3 is an enlarged fragmentary sectional view taken on line 3—3, FIG. 2, with the clutch in engaged position.
Figure 4:
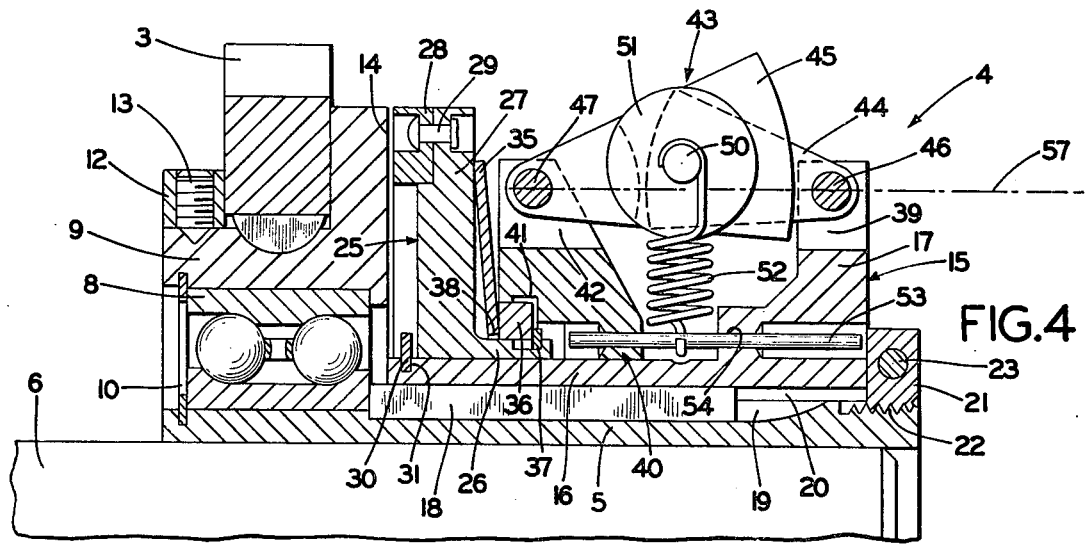
FIG. 4 is a view similar to FIG. 3 with the clutch in disengaged position.

Drive member 4 includes an annular rotor member 15 having a cylindrical base 16 and an annular radially extending flange end 17 (FIGS. 3 and 4). Rotor 15 is mounted on sleeve 5 for rotation with sleeve 5 and shaft 6 by a key 18 which is mounted in a slot 19 formed in sleeve 5, key 18 projects into a corresponding slot 20 formed in rotor base 16. Rotor 15 is axially adjustably mounted on sleeve 5 the key-slot arrangement 18 and 20, and is secured in an axial adjusted position by an adjusting collar 21 which is threadably engaged with threaded end 22 of sleeve 5. A clamping lock pin 23 (FIG. 2) extends through splits ends of collar 21 to secure collar 21 and rotor 15 in their adjusted positions.

In accordance with one of the main features of the invention, a cartridge indicated gnerally at 25, is slidably mounted on the inner end of rotor base 16. Cartridge 25 includes an annular sleeve-like base 26 with an integral radially extending annular flange-like body 27. Cartridge 25 is fixed for rotation with shaft 6 and sleeve 5 by a key 34 (FIG. 5) extending between rotor base 16 and cartridge base 26. A ring 28 of frictional material is mounted by rivets 29 on the periphery of body 27 for engagement with the periphery of coupling surface 14 of driven member 2. A retaining ring 30 is mounted in a groove 31 formed in the inner end of rotor base 16 to limit the axial movement of cartridge 25 in a direction toward driven member 2.

Figure 8:
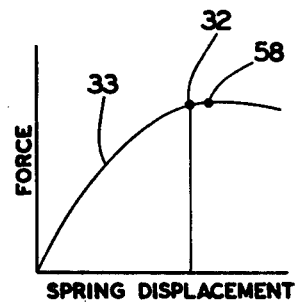
FIG. 8 is a graph showing the force-displacement relationship of the preloaded disc spring.

A disc-type spring 35, commonly known as "Belleville spring," is telescopically mounted on cartridge base 26 and is placed in a preloaded or stressed condition against cartridge body 27 by a collar 36 and a retaining spring 37. Spring 35 is formed with a central opening 38 through which cartridge base 26 extends to telescopically mount spring 35 on cartridge 25. Spring 35 is compressed to a condition preferably approaching a zero of negative spring rate as shown by point 32 (FIG. 8) on the spring rate curve 33 of spring 35.

An annular drive block 40 is slidably mounted on rotor base 16 for axial movement therealong and is fixed for rotation with shaft 6 and sleeve 5 by a separate key or by a key 34, extending between rotor base 16 and block 40. Block 40 is formed with a shoulder 41 which is engageable with collar 36 of cartridge 25 for further compressing and loading spring 35 in a manner described below. The outer periphery of block 40 is formed with four equally spaced slotted projections 42 which align with similar slotted projections 39 formed on the periphery of body 17 of rotor 15 (FIGS. 3 and 4).

Another important feature of the invention is the pivotal mounting and arrangement of a plurality of link assemblies, indicated generally at 43. Link assemblies 43, four of which are shown and illustrated in the drawings, are mounted in equally spaced relationship with respect to each other (FIG. 2), about the circumference of drive member 4 within slotted projections 39 and 42. Each link assembly 43 includes a pair of spaced links 45 and a single link 44 which is located partially between spaced links 45.

The links have generally triangular-shaped configurations with their apexes being pivotally mounted by pins 46 and 47 within slotted projections 39 and 42, respectively, of rotor 15 and drive block 40. Links 44 are located between spaced links 45 with the inner end of each link 44 being pivotally joined to the midpoints or inner ends of links 45 by pins 50. A pair of weight discs 51 (FIG. 6) also may be mounted on pin 50 adjacent the ends thereof. A triangular-shaped spacer 56 preferably is mounted on pivot pin 47 and extends outwardly between links 45 to maintain the proper separation therebetween and to increase the weight acted upon by centrigual force to effect the operation of the link assemblies.

A pair of coil springs 52 is connected to the outer ends of each pin 50 and to a pair of rods 53 which extend through axially aligned holes 54 and 55 in rotor 15 and drive block 40, respectively. Springs 52 bias links 44 and 45 and particular pivot connection pin 50 radially inwardly toward shaft 6 and into retracted position, as shown in FIG. 3. Rods 53 provide an attachment point for springs 52 and enable block 40 to slide axially along rotor base 16 without affecting pins 53 and the attachment of springs 52.

The centers of pivot pins 46 and 47 lie on an imaginary line 57 which extends therethrough and parallel with shaft 6 (FIGS. 3 and 4). In accordance with one of the main features of the invention, pins 50 are located radially inwardly of imaginary centerline 57 when in retracted position (FIG. 3), and are located radially outwardly of imaginary line 57 when in expanded position (FIG. 4) as described below.

The operation of improved quick release clutch construction 1 is described below. Assume clutch 1 is at rest as shown in FIG. 3. Collar 21 is adjusted until shoulder 41 of drive block 40 contacts cartridge collar 36 and axially advances collar 36 just out of contact with retaining ring 37. This movement preloads spring 35 a slight additional amount, as indicated by point 58 on spring rate curve 33 (FIG. 8), and insures the operational engagement of link assemblies 43 with cartridge 25.

Frictional surface 28 of cartridge 25 is forced into coupled engagement with surface 14 of driven member 2 by the compressed preloaded spring 35 due to engagement of drive block shoulder 41 with retaining collar 36. Cartridge 25 is moved axially toward driven member 2 by block 40 until link assemblies 43 have reached fully retracted position, providing sufficient coupling pressure between the clutch members 2 and 4. Cartridge 25 may or may not contact retaining ring 30 when in coupled position depending upon the amount of wear of friction ring 28. Links 45 abut rotor 15 and drive block 40 as shown in FIG. 3 upon reaching retracted position to limit the inward movement thereof and to limit the axial movement of block 40 towards cartridge 25. When in retracted position, the centerlines of the links preferably form an angle of approximately 5° with centerline 57.

When link assemblies 43 are in the retracted positions of FIG. 3, pivot pins 50 are located radially inwardly of imaginary lines 57 connecting the centers of pivot pins 46 and 47. Springs 52 possess sufficient force to overcome the preloaded stress of disc spring 35 in order to move cartridge 25 axially toward driven member 2 and to operatively disengage collar 36 from contact with retaining ring 37. This disengagement of collar 36 from retaining ring 37 insures coupling of the clutch members and the resulting action against link assemblies 43 to assist springs 52 in retaining the link assemblies in retracted position until acted upon by sufficient centrifugal force.

The inner ends of links 44 and 45, spacer washers 56 and weight 51 begin to move radially outwardly under the influence of centrifugal force overcoming the tension of springs 52 upon rotation of clutch 1. Initial upward movement of the links, weights and pivot pins 50 has no appreciable effect upon the coupling engagement between members 2 and 4 due to the location of pins 50 radially inwardly of centerlines 57. This initial outward movement of the links may even increase the coupling force depending upon the particular preloaded condition of disc spring 35 since drive block 40 is moved further axially toward cartridge 25 as pins 50 move radially outwardly toward centerlines 57 since pins 46 are fixed against axial movement by collar 21. Pins 50 continue to move radially outwardly as the rotational speed increases of shaft 6 and connected clutch members 2 and 4.

Generally simultaneously upon pins 50 moving radially outwardly beyond centerlines 57, the inner link ends and weights 51 fly outwardly to the extended position of FIG. 4 due to the preloaded force of disc spring 35 now acting against springs 52 instead of aiding springs 52 as occurs when pins 50 are below centerlines 57. This outward movement of the link assemblies slides drive block 40 axially toward rotor body 17 and disengages drive block shoulder 41 from collar 36. Consequently, the coupling pressure exerted on driven member 2 by cartridge 25 is removed, instantaneously disengaging coupling surfaces 14 and 28. Cartridge 25 in turn is freely axially movable on rotor base 16 between retaining rings 30 and 37 and exerts no coupling force against driven member surface 14 even though disc spring 35 is still in a prestressed or loaded condition.

Figure 7:
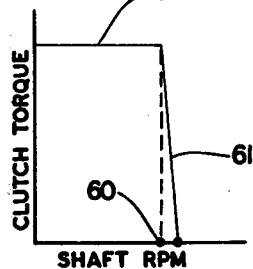
FIG. 7 is a graph showing the relationship of the drive shaft speed versus the torque exerted by the clutch.

These characteristics are shown in the graph of FIG. 7 wherein the clutch torque remains constant as indicated by line 59 until the clutch shaft reaches disengagement speed indicated by point 60. Theoretically, the clutch torque drops to zero instantaneously upon reaching point 60 as described above. However, due to friction, spring stiffness, etc., the torque is not completely reduced to zero until the shaft passes the theoretical disengagement point, as shown by line 61.

The centrifugal force decreases on the inner link ends and attached weights 51 as the rotational speed of shaft 6 and drive member 4 decreases. The tension of springs 52 eventually overcomes the centrifugal force acting upon the links and weights when a predetermined reduced speed is reached, whereupon pivot pins 50 move radially inwardly over centerline 57 from the expanded position of FIG. 4 to the retracted position of FIG. 3.

This inward movement of pins 50 under the influence of springs 52 forcibly slides drive block 40 toward driven member 2 through links 45 due to collar 21 preventing any axial outward movement of rotor member 15. Shoulder 41 again contacts cartridge retaining collar 36 and begins to move cartridge 25 axially towards driven member 2 as links assemblies 43 continue to move toward retracted position. Immediately upon pins 50 moving below centerlines 57, cartridge 25 is firmly locked in coupled position with driven member 2 by link assemblies 43 eliminating any slippage between coupling surfaces 14 and 28. Coupling engagement may occur just prior to pins 50 reaching centerlines 57 depending upon the particular adjustment of collar 21, wear condition of friction surface 28, prestressed condition and characteristics of disc spring 35, etc.

Improved clutch construction 1 has a number of advantageous features not believed present in prior art clutches. The preloading of disc spring 35 permits a large force amplification to be achieved through a very small motion of the applying force. Depending upon the particular clutch characteristics desired, cartridge 25 may move through a distance of several thousandths of an inch for coupling and uncoupling with driven member 2. Likewise, drive block 40 only moves through a relatively short distance depending upon the length of the links and spring of pins 46 and 47. Such small operational distances provide for a compact clutch and considerable space savings.

Improved clutch 1 provides for a stepped force-displacement relationship between the force applied to the disc spring 35 and the displacement of spring 35 due to the prestressed or loaded condition of spring 35 on cartridge 25. This enables a variety of clutch characteristics to be achieved by the selection of a spring 35 and the amount of preloading placed thereon. For example, spring 35 may be predisplaced to its point of maximum deflection on its spring load curve, or can be displaced to a point having a negative slope on the spring load curve, each of which will provide different clutch operating characteristics. Prior art clutches using coil springs for retaining the clutch in coupled position, such as shown in U.S. Pat. Nos. 1,316,466 and 1,585,567, have a linear force-displacement spring characteristic until clutch disengagement occurs and not a stepped relationship as in improved clutch 1.

Preloaded disc spring 35 exerts a force against shoulder 41 of drive block 40 (FIG. 3), which due to the location of pivot pins 50 below centerlines 57, aid springs 52 in retaining link assemblies 43 in retracted position and the clutch members in coupled position. Therefore, the centrifugal force acting upon links 44–45 and weights 51 must overcome the forces of both springs 35 and 52. However, as the centrifugal force acting upon the link assemblies starts to balance the forces of springs 35 and 52 upon pins 50 reaching centerlines 57, the full preloaded force of spring 35 is maintained on cartridge 25 and on coupling surfaces 14 and 28. This eliminates or greatly reduces the slippage and excess heating which occurs in prior clutches upon approaching disengagement speed.

Likewise, immediately upon pins 50 moving radially outwardly beyond centerlines 57, the preloaded force of disc spring 35 which heretofore assisted springs 52 in maintaining clutch engagement, acts against drive block 40 and springs 52 to "snap" the link assemblies into the extended position of FIG. 4 and disengage coupling surfaces 14 and 28. Thus, preloaded cartridge 25 provides a positive quick acting disengagement for clutch 1 upon reaching disengagement speed, and provides for a positive lock-in action upon reaching reengagement speed.

Accordingly, improved quick release centrifugal clutch construction 1 provides a construction which has a rapid or "snap-out" forceful disengagement of the coupled clutch members upon the driving shaft reaching a predetermined speed, and which provides a positive forceful "lock-in" reengagement when the shaft speed is sufficiently reduced to a predetermined reengagement speed which is lower than the disengagement speed; provides a clutch construction which eliminates or greatly reduces slippage and excess heating occurring between the clutch members upon engagement and disengagement thereof; provides a clutch construction which enables a variety of clutch characteristics to be achieved by choosing a disc spring having specific characteristics and by placing such spring in a predetermined preloaded condition with respect to its spring load curve; provides a clutch construction achieving large force amplification by an extremely small movement of the clutch components resulting in a considerable space savings and providing a compact clutch arrangement; and provides a clutch construction which is simplified, effective, safe and highly efficient which achieves all the enumerated objectives, provides for eliminating difficulties encountered with prior clutch costructions and devices, and which solves problems and obtains new results in the art.

In the foregoing description certain terms have been used for brevity, clearness and understanding; but no unnecessary limitations are to be implied therefrom beyond the requirements of the prior art, because such words are used for descriptive purposes herein and are intended to be broadly construed.

Moreover, the embodiment of the improved construction illustrated and described herein is by way of example, and the scope of the present invention is not limited to the exact details of construction shown or described.

Having now described the features, discoveries and principles of the invention, the manner in which the improved quick release centrifugal clutch construction is constructed, assembled and operated, the characteristics of the new construction, and the advantageous, new and useful structures, devices, elements, arrangements, parts, and combinations are set forth in the appended claims.

I claim:

1. A quick release centrifugal clutch construction including
   a. power driven rotary shaft means;
   b. a driven clutch member;
   c. cartridge means mounted on the shaft means and slidable axially along said shaft means for coupling engagement with the driven clutch member for drivingly rotating said driven clutch member;
   d. disc spring means mounted on the cartridge means and preloaded to a predetermined displaced biased condition;
   e. block means mounted on the shaft means and slidable axially along said shaft means for operative engagement with the preloaded disc spring means;
   f. a pair of link means pivotally connected to their inner ends, with the outer end of one of said link means being pivotally connected in a fixed position with respect to the shaft means, and the outer end of the other of said link means being pivotally connected to the block means, the inner ends of said link means being movable radially inwardly and outwardly between retracted and extended positions, respectively, with the pivotal connection of the link means inner ends being located radially inwardly of an imaginary line extending between the pivotal connections of the outer ends of the link means when in retracted position; and g. coil spring means biasing the link means inner ends radially inwardly toward retracted position and biasing the block means into engagement with the preloaded disc spring means to drivingly connect the cartridge means and driven clutch member when the link means are in retracted position, said link means inner ends moving radially outwardly under the influence of centrifugal force from retracted toward extended position and disengaging generally instantaneously the block means from operative engagement with the cartridge means to disconnect the cartridge means from driving engagement with the driven member upon the pivot connection of the link means inner ends moving radially outwardly of the imaginary line when the shaft means reaches a predetermined rotational speed.

2. The construction defined in claim 1 in which the shaft means includes a shaft, a cylindrical sleeve telescopically mounted on the shaft and a rotor mounter on said sleeve; in which the rotor is fixed for rotation with the shaft and sleeve and is axially movable along said sleeve; and in which said one end of the link means is pivotally connected to the rotor.

3. The construction defined in claim 2 in which rod means extends in an axial direction between the rotor and block means; and in which one end of the coil spring means is connected to the rod means and the other end of said coil spring means is connected to the pivot connection of the link means inner ends.

4. The construction defined in claim 2 in which adjustment means is mounted on the cylindrical sleeve and is operatively engagement with the rotor for axially adjusting the rotor and block means on the shaft means.

5. The construction defined in claim 1 in which weight means is mounted on the inner ends of the link means to increase the centrifugal force acting thereon during rotation of the shaft means.

6. The construction defined in claim 1 in which the cartridge means includes a sleeve-like base telescopically mounted on the shaft means and an integral radially extending body portion; in which the disc spring means is telescopically mounted on the base and engageable with the body portion; and in which retaining means is mounted on the base and maintains the disc spring means in compression against the body portion.

7. The construction defined in claim 6 in which the retaining means is a collar telescopically mounted on the cartridge means base and axially thereon and a lock ring maintaining the collar in compressive engagement with the disc spring means.

8. The construction defined in claim 7 in which the block means is engageable with the collar to move the collar, cartridge means and disc spring means axially toward the driven clutch member.

9. The construction defined in claim 1 in which the preloaded bias of the disc spring means is exerted against the link means to assist the bias of the coil spring means in retaining said link means in retracted position; and in which said preloaded bias of the disc spring means is exerted against the link means and acts against the bias of the coil spring means when the link means are in extended position.

10. A centrifugal clutch construction including:
a. rotary shaft means;
b. a driven clutch member rotatably mounted on the shaft means and having a coupling surface;
c. rotor means mounted on the shaft means for rotation with said shaft means;
d. cartridge means mounted on the rotor means and movable axially along said rotor means, said cartridge means having a coupling surface adapted to engage the driven clutch member coupling surface for drivingly rotating said driven clutch member;
e. first spring means mounted on the cartridge means and preloaded to a predetermined compressed condition;
f. block means mounted on the rotor means and movable axially along said rotor means for operative engagement with the first spring means to force the cartridge means into coupling engagement with the driven clutch member;
g. a plurality of pairs of link means equally spaced circumferentially about the rotor means, each of said pairs having first and second links pivotally connected at their outer ends to the rotor means and block means, respectively, with their inner ends being pivotally connected to each other, said link means being movable radially inwardly and outwardly between retracted and extended positions, respectively, with said inner ends pivotal connection being located radially inwardly of an imaginary line extending between the pivotal connections of the outer ends of the link means when in retracted position; and
h. second spring means biasing the link means inner ends radially inwardly toward retracted position to maintain the block means in engagement with the cartridge means to drivingly connect the coupling surfaces until the drive shaft means reaches a predetermined speed with said link means moving radially outwardly under the influence of centrifugal force from retracted toward extended position, whereupon the block means disengages generally instantaneously from operative engagment with the cartridge means to uncouple the drivingly engaged coupling surfaces upon the inner ends pivotal connection moving radially outwardly beyond the imaginary line.

11. The construction defined in claim 10 in which the rotor means is movably mounted on the shaft means for axial adjustment therealong; and in which locking means is mounted on the shaft means for securing the rotor means in an axially adjusted position.

12. The construction defined in claim 11 in which the shaft means includes a shaft and a cylindrical sleeve telescopically mounted on the shaft; in which a key extends between the sleeve and rotor means adjustably mounting the rotor means on the sleeve; and in which the locking means is a collar threadably mounted on an end of the sleeve and engageable with the rotor means for adjustably positioning the same.

13. The construction defined in claim 10 in which the first spring means is a disc spring formed with a central opening; in which the cartridge means includes a cylindrical base and a radially outwardly extending flange portion; in which the cylindrical base extends through the central disc spring opening telescopically mounting the disc spring on the cartridge base with the periphery of the disc spring engaging the radial flange portion of the cartridge means; and in which retaining means is mounted on the cartridge means base engageable with and placing the disc spring in the preloaded compressed condition.

14. The construction defined in claim 10 in which a plurality of axially aligned slots are formed in the rotor means and block means; and in which the outer ends of the link means are pivotally mounted within said slots.

15. The construction defined in claim 10 in which the pivotal connection point of the link means inner ends moves through an arc of approximately 5° in moving from fully retracted position to the imaginary line extending between the pivotal connection points of the outer link ends.

* * * * *

UNITED STATES PATENT AND TRADEMARK OFFICE
CERTIFICATE OF CORRECTION

PATENT NO. : 4,062,433
DATED : December 13, 1977
INVENTOR(S) : Richard C. St.John It is certified that error appears in the above-identified patent and that said Letters Patent are hereby corrected as shown below:

Column 1, line 30, "srping" should be -spring-
Column 2, line 11, "relase" should be -release-
Column 4, line 23, "annulr" should be -annular-
Column 4, line 34, add the word "by" after "5" and before "the"
Column 4, line 38, "splits" should be -split-
Column 4, line 41, "gnerally" should be -generally-
Column 4, line 54, add the word "a" after the word "as" before the word "Belle-"
Column 4, line 58, "spring" should be -ring-
Column 4, line 62, eliminate the word "of"
Column 8, line 31, "costructions" should be -constructions-
Column 9, line 31, "mounter" should be -mounted-
Column 9, line 44, "engagement" should be -engageable-
Column 9, line 60, add the word "movable" after the word "axially" and before the word "thereon"
Column 10, line 44, add the word "then" after the word "means" and before the word "moving"

Signed and Sealed this

Seventh Day of March 1978

[SEAL]

Attest:

RUTH C. MASON
Attesting Officer

LUTRELLE F. PARKER
Acting Commissioner of Patents and Trademarks